Feb. 17, 1970  J. J. ROSE  3,495,622
PRESSURE FILLING AND RELIEF VALVE
Filed Nov. 6, 1967
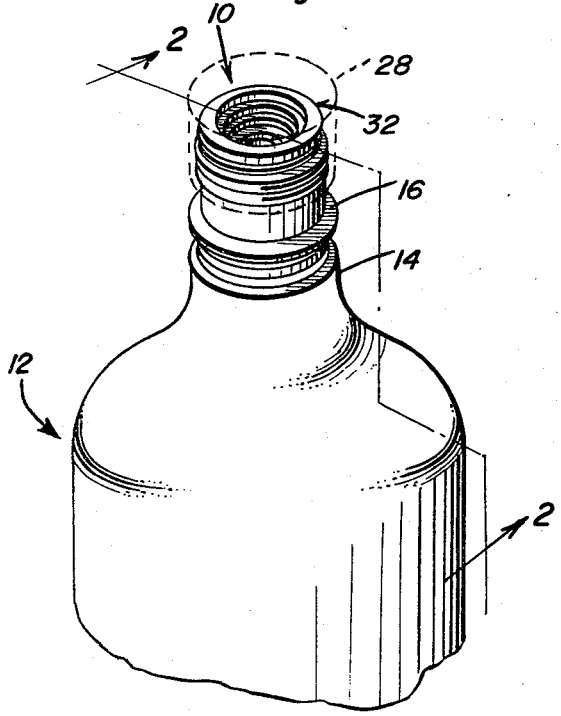
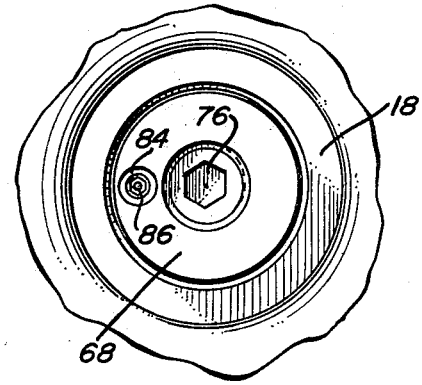
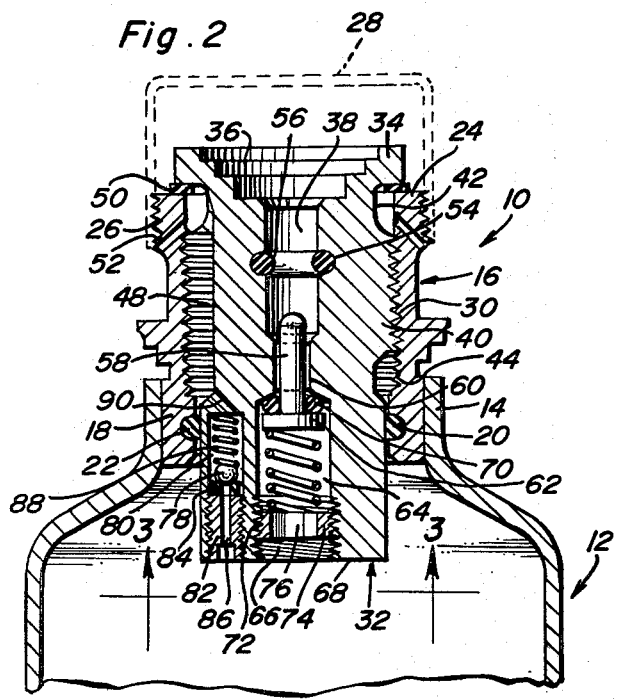
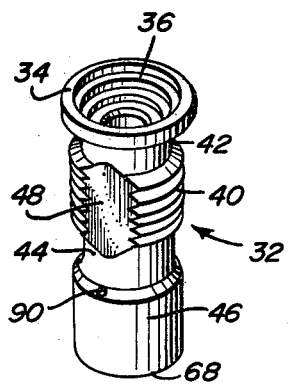
John J. Rose
INVENTOR.

United States Patent Office 3,495,622
Patented Feb. 17, 1970

3,495,622
PRESSURE FILLING AND RELIEF VALVE
John J. Rose, Mentor, Ohio, assignor to Re-Nu, Inc.,
a corporation of Ohio
Filed Nov. 6, 1967, Ser. No. 680,918
Int. Cl. F16k 45/00; B65d 83/00, 83/14
U.S. Cl. 137—588    6 Claims

ABSTRACT OF THE DISCLOSURE

A valve assembly for a propane gas cylinder having a valve body which mounts both a pressure closed filling valve and a pressure relief valve. A vent passage for the relief valve includes a sealed cavity formed between a tubular closure member and a flat on the externally threaded portion of the valve body received by the closure member. Both valves are exposed to internal pressure at the inner axial end face of the valve body.

---

This invention relates to a valve fitting for a portable type of fluid pressurized container such as a propane gas cylinder and more particularly to a combined valve assembly functioning both as a filling valve and a pressure relief valve.

The present invention is concerned with valve fittings for pressurized gas cylinders capable of sealing the cylinder against gas leakage in an effective manner. Further, the valve fitting of the present invention is designed to be easily installed and removed for adjustment or repair purposes in the neck of the gas cylinder.

In accordance with the present invention the valve assembly includes a valve body that is held in sealed relation within a tubular closure member fitted into the neck of the gas cylinder. The valve body is threadedly mounted within the tubular closure member and projects axially into the cylinder in wiping contact with an annular sealing element seated by the tubular closure member. The axially outer end portion of the valve body seals the vent passage formed between the valve body and the tubular closure member. The vent passage communicates with outlet ports which direct vented fluid in a direction away from the outlet end of the valve body and also communicates with a one-way valve device adjustably mounted within the valve body for exposure to the internal pressure of the cylinder parallel to the filling valve urged by the internal pressure to a closed position blocking flow through a central passage.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 1 is a perspective view showing a typical installation for the valve assembly of the present invention.

FIGURE 2 is a sectional view taken substantially through a plane taken by section line 2—2 of FIGURE 1.

FIGURE 3 is a bottom plan view of the installed valve assembly as seen from a plane indicated by section line 3—3 in FIGURE 2.

FIGURE 4 is a perspective view of the valve assembly.

Referring now to the drawings in detail, it will be observed that the assembly of the present invention generally referred to by reference numeral 10 is associated with a container 12 of pressurized fluid such as a propane gas cylinder. The valve assembly is fitted into the neck portion 14 of the container and normally seals the container so as to prevent escape of gas under pressure. The valve assembly accommodates both the controlled discharge of gas from the container and filling of the container with gas under pressure. Also, should the pressure of the gas within the container become excessive, it will be controllably vented through the valve assembly.

The valve assembly includes a tubular closure member 16 having an inner axial end portion 18 firmly secured to the neck portion 14 of the container in any suitable manner. An annular recess 20 is formed within the axial end portion 18 in order to seat an annular O-ring sealing element 22. The outer axial end portion 24 of the closure member is externally threaded at 26 and thereby adapted to receive a closure cap 28 as shown by dotted lines in FIGURES 1 and 2. The intermediate portion of the tubular closure member between the end portions 18 and 24 is internally threaded at 30 in order to threadedly receive an axially elongated valve body 32.

The valve body includes a flanged end portion 34 having a stepped diameter inlet opening 36 adapted to receive an appliance tip of a torch, lantern, gas heater, etc. The inlet communicates with an entry portion 38 forming part of central filling passage that extends axially through the valve body. The valve body is formed intermediate its end portions with an externally threaded section 40 spaced from the end portion 34 by a reduced diameter portion 42. A reduced diameter portion 44 also spaces the externally threaded section 40 from an end section 46 which projects into the container 12 from the tubular closure member 16. The end section 46 has a smooth cylindrical surface so as to effectively contact the annular sealing element 22 and seal one axial end of a vent cavity formed between the internally threaded portion 30 of the tubular closure member and a flat 48 on the externally threaded section 40 of the valve body. Thus, because of the flat 48, the annular cavities formed between the tubular closure member and the reduced diameter portions 42 and 44 of the valve body are in fluid communication with each other. An annular sealing gasket 50 is clamped between the flanged end portion 34 of the valve body and the outer axial end portion 24 of the tubular closure member in order to seal the vent passage at the axial end opposite the annular sealing element 22. The vent passage communicates with atmosphere through a plurality of restricted outlet ports 52 formed in the tubular closure member as shown in FIGURE 2. The outlet vent ports 52 extend at an angle of 45° for example to the axis of the valve body in order to direct vented fluid away from the outlet end of the valve body. Thus, the danger inherent during release of pressurized gas because of its proximity to a heated appliance, is minimized.

The valve body 32 is provided with an annular recess 54 within the entry port 38 in order to seat an O-ring sealing element 56. The sealing element 56 is adapted to contact and seal the filling passage as the actuating pin of the appliance tip (not shown) enters the entry port in order to displace a valve element 58. The valve element extends through a reduced diameter portion 60 of the filling passage and is connected to a pressure responsive valve land 62 within a diametrically enlarged cavity 64 having an internally threaded portion 66 which opens into the container 12 at the axial inner end face 68 of the valve body. It will be apparent therefore, that the internal pressure within the container 12 acting against the land 62 will firmly hold the valve 58 in a closed position compressing the annular sealing element 70 on the valve seat. The valve is also maintained in a closed position under the continuous urge of a spring 72 reacting between the valve land 62 and an externally threaded adjustment element 74 mounted in axially adjusted position within the internally threaded portion 66 of cavity 64. A passage opening 76 is formed in the element 74 in order to expose the valve land 62 to the internal pressure of the container.

Also exposed to the internal pressure of the container through the end face 68 of the valve body, is a one-way valve element 78. The valve element 78 is of the ball-type and is enclosed within an elongated valve cavity 80 which extends generally parallel to the central filling passage in the valve body. The valve cavity 80 threadedly mounts in an axially adjusted position, an adjustment element 82 in order to adjustably position a seating gasket 84 on which the valve element 78 is seated. A passage 86 extends through the element 82 in order to expose the valve element 78 to the internal pressure of the container 12. The valve element is however biased to a closed position by means of a spring 88 enclosed within the valve cavity 80. Fluid communication is established between the valve cavity 80 and the cavity formed between the flat 48 and the tubular closure member 16, through a connecting passage 90. It will be apparent therefore, that upon opening of the valve element 78 against the bias of spring 88 by an excessive internal pressure, fluid will be vented to atmosphere until the internal pressure drops below the predetermined spring pressure on the one-way valve element 78.

The construction, operation and utility of the valve assembly 10 will be apparent from the foregoing description. After the tubular closure member is installed in the neck portion 14 of the container, the valve body 32 may be simply threaded into the tubular closure so that its end portion 46 projects into the container in wiping contact with the annular sealing element 22. The vent passages formed between the tubular closure member and valve body will also be sealed when the end flange portion 34 of the valve body clamps the sealing gasket 50 against the outer end portion 24 of the tubular closure member. Regulated discharge of fluid from the container or recharging of the container may be effected by insertion of an appliance tip into the entry port 38 in order to axially displace the valve element 58 against the bias of spring 72 causing it to unseat against the spring pressure and the internal pressure of the container. Further, should the internal pressure of the container become excessive, fluid will be vented by opening of the one-way valve element 78 against the bias of spring 88, vented fluid being discharged through the outlet passages 52 in a direction away from the outer end of the valve body in order to avoid any danger of combustion where a combustible gas is utilized such as propane gas. The spring bias on both the valve elements 58 and 78 may be adjusted by axial positioning of the adjustment elements 74 and 82 through which the valve elements are exposed to the internal pressure of the container at the inner face 68 of the valve body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A valve assembly for a pressurized container comprising a valve body having a filling passage, closure means for holding said valve body in sealed relation to the container having a vent passage formed therein, and one-way valve means mounted in the valve body for venting excessive pressure through the vent passage in the closure means independently of said filling passage, said valve body including threaded means cooperating with the closure means to seal the container and a cavity formed between the valve and the closure means said cavity establishing fluid communication between the one-way valve means and the vent passage.

2. A combined filling and relief valve assembly for a pressurized container comprising a valve body, closure means for holding said valve body in sealed relation to the container, externally displaceable valve means mounted by the valve body for closing a filling passage formed in the valve body, and one-way valve means mounted in the valve body for venting excessive pressure through the closure means independently of said filling passage, said valve body includes an externally threaded section having a flat portion forming a vent cavity with the closure means to establish fluid communication between the one-way valve means and a vent passage in the closure means, said valve body also having an externally smooth section projecting in sealed relation through the closure means into the container and an end portion outside of the container abutting the closure means, said one-way valve means being mounted within the externally smooth section of the valve body.

3. The combination of claim 2 wherein said closure means a tubular member threadedly receiving the externally threaded section of the valve body between the externally smooth section and the end portion, an annular sealing element mounted by the tubular member in contact with the externally smooth section of the valve body and a sealing washer clamped between the tubular member and the end portion of the valve body, said vent passage being formed in the tubular member externally of the container at an angle directing vented fluid away from the end portion of the valve body.

4. The combination of claim 3 wherein said one-way valve means includes a valve seating element adjustably mounted in the valve body in parallel spaced relation to the filling passage, a valve element enclosed within the valve body and spring means holding the valve element on the valve seating element against pressure within the container.

5. A valve assembly for a pressurized container including a valve body, closure means for holding the valve body in sealed relation to the container and one-way valve means mounted in the valve body for venting excessive pressure through the closure means, said valve body including an externally threaded section having a flat portion forming a vent cavity with the closure means to establish fluid communication between the one-way valve means and a vent passage in the closure means, said valve body also having an externally smooth section projecting in sealed relation through the closure means into the container and an end portion abutting the closure means externally of the container, said one-way valve means being mounted within the externally smooth section of the valve body.

6. The combination of claim 5 wherein said closure means comprises a tubular member threadedly receiving the externally threaded section of the valve body between the externally smooth section and the end portion, an annular sealing element mounted by the tubular member in contact with the externally smooth section of the valve body and a sealing washer clamped between the tubular member and the end portion of the valve body, said vent passage being formed in the tubular member externally of the container at an angle directing vented fluid away from the end portion of the valve body.

References Cited

UNITED STATES PATENTS

| | | | |
|---|---|---|---|
| 3,143,253 | 8/1964 | Lindgren et al. | 222—396 |
| 3,155,292 | 11/1964 | Webster | 222—397 |
| 3,265,102 | 8/1966 | Yoshinaga | 137—588 |
| 3,283,959 | 11/1966 | Muller | 222—396 |

HENRY S. JAUDON, Primary Examiner

U.S. Cl. X.R.

222—396